(12) United States Patent
Matsuoka et al.

(10) Patent No.: US 7,231,052 B2
(45) Date of Patent: Jun. 12, 2007

(54) VIBRATION-ISOLATING AND SOUND ISOLATING SYSTEM FOR VEHICLE

(75) Inventors: Hideki Matsuoka, Wako (JP); Toshio Inoue, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 749 days.

(21) Appl. No.: 10/620,037

(22) Filed: Jul. 15, 2003

(65) Prior Publication Data

US 2004/0086134 A1 May 6, 2004

(30) Foreign Application Priority Data

Jul. 18, 2002 (JP) .............................. 2002-210030
Jul. 23, 2002 (JP) .............................. 2002-213704

(51) Int. Cl.
*H03B 29/00* (2006.01)
*A61F 11/06* (2006.01)

(52) U.S. Cl. ..................................... 381/71.4; 381/71.9

(58) Field of Classification Search ............... 381/71.1, 381/71.4, 71.5, 71.9
See application file for complete search history.

(56) References Cited

U.S. PATENT DOCUMENTS 5,321,759 A * 6/1994 Yuan .......................... 381/71.9
5,617,315 A * 4/1997 Nakao et al. ................... 701/36
5,850,458 A * 12/1998 Tomisawa et al. .......... 381/71.4
5,910,993 A * 6/1999 Aoki et al. ............... 381/71.12
2001/0036279 A1* 11/2001 Daly .......................... 381/71.4

FOREIGN PATENT DOCUMENTS

| JP | 6-87335 | 3/1994 |
| JP | 9-273589 | 10/1997 |
| JP | 11-338553 | 12/1999 |
| JP | 2002-139095 | 5/2002 |

* cited by examiner

*Primary Examiner*—Brian Tyrone Pendleton
(74) *Attorney, Agent, or Firm*—Hamre, Schumann, Mueller & Larson, P.C.

(57) ABSTRACT

An engine is supported on a vehicle body frame through an active vibration-isolating device. The vibration of the engine is prevented from being transmitted to the vehicle body frame by controlling the active vibration-isolating device. A speaker is disposed within a vehicle compartment. The noise is reduced by adaptively controlling the speaker based on a rotational speed of the engine and a noise detected by a microphone disposed within the vehicle compartment. Thus, the vibration and noise characteristics of the vehicle can be improved by a synergic effect of reducing both the vibration and the noise. Further, because the microphone is inexpensive and the speaker for an audio set can be used without any modification, the present invention can be achieved with a low cost.

3 Claims, 7 Drawing Sheets

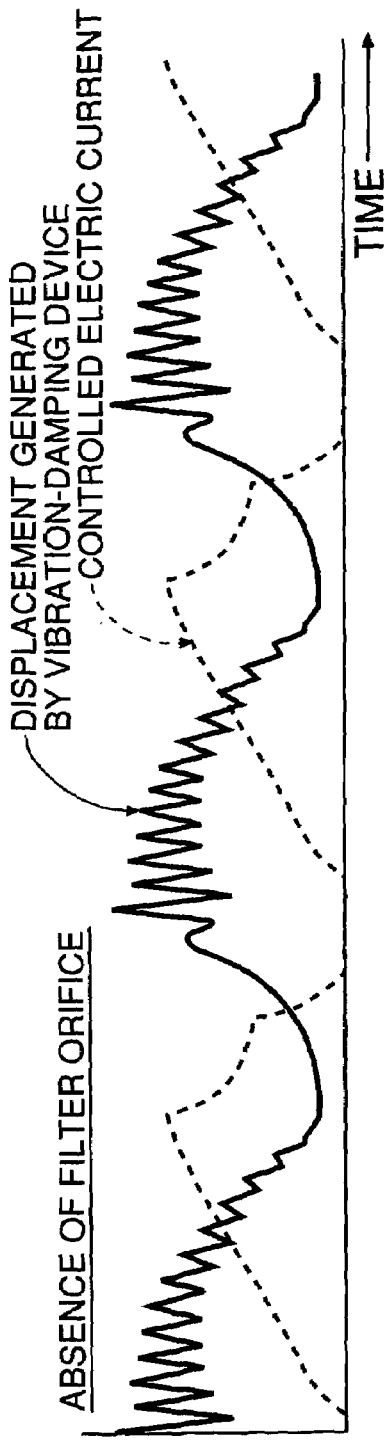
FIG.5A ABSENCE OF FILTER ORIFICE
DISPLACEMENT GENERATED BY VIBRATION-DAMPING DEVICE CONTROLLED ELECTRIC CURRENT

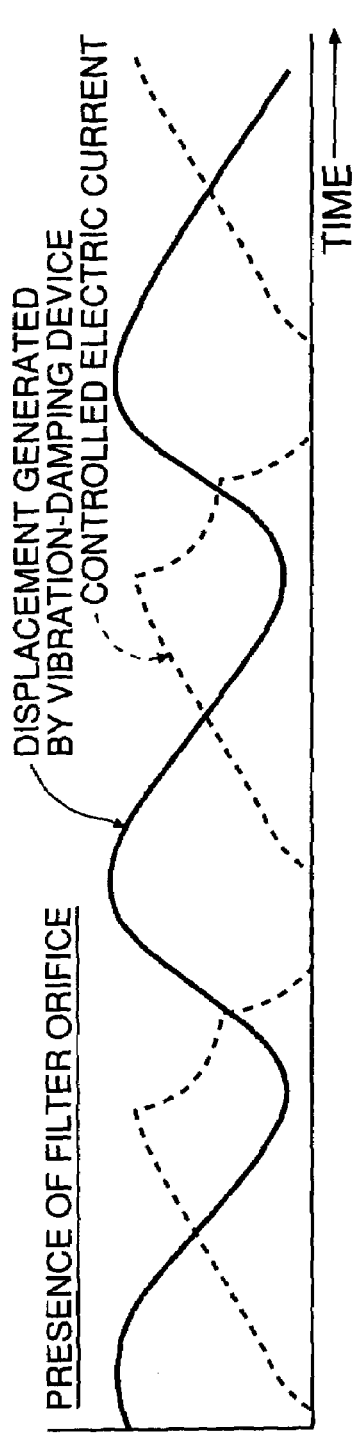
FIG.5B PRESENCE OF FILTER ORIFICE
DISPLACEMENT GENERATED BY VIBRATION-DAMPING DEVICE CONTROLLED ELECTRIC CURRENT

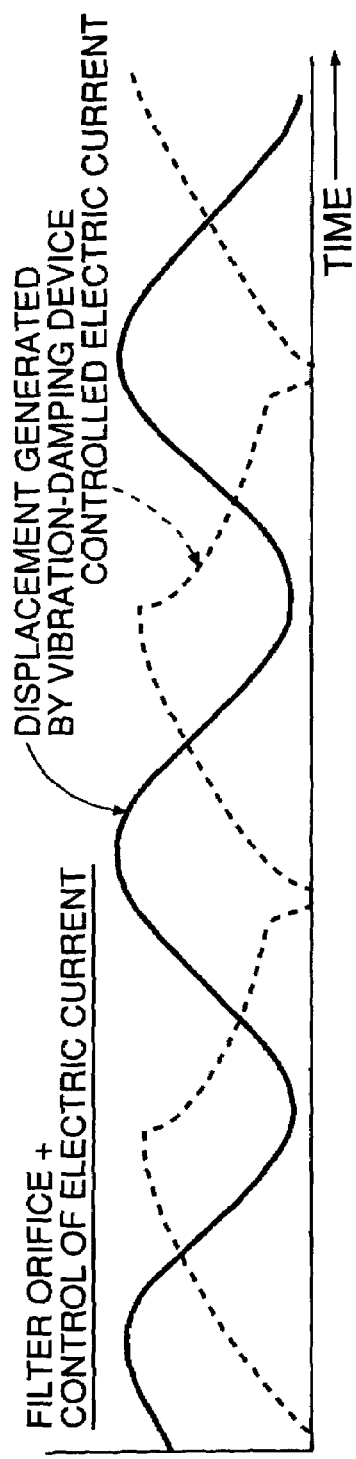
FIG.5C FILTER ORIFICE + CONTROL OF ELECTRIC CURRENT
DISPLACEMENT GENERATED BY VIBRATION-DAMPING DEVICE CONTROLLED ELECTRIC CURRENT

PRSENT INVENTION

VIBRATION-ISOLATING AND SOUND ISOLATING SYSTEM FOR VEHICLE

BACKGROUND OF THE INVENTION

1. Field of the Invention

The present invention relates to a vibration-isolating and sound-isolating system for a vehicle for reducing the vibration provided by an engine of an automobile and noises such as, exhaust sound and intake sound in the engine.

2. Description of the Related Art

A conventional active vibration-isolating system used in an engine mount of an automobile is described in Japanese Patent Application Laid-open No. 9-273589. The active vibration-isolating system is fixed at its upper end to an engine which is a vibration source and at its lower end to a vehicle body frame through a load sensor. A load of vibration transmitted from the engine to the vehicle body frame is detected by the load sensor, and the active vibration-isolating system is controlled so as to eliminate a change in the load, thereby achieving a vibration-isolating effect.

In the conventional active vibration-isolating system, the vibration transmitted from the engine to the vehicle body frame can be reduced, but the intake sound and the exhaust sound which are a vibration and a noise not passing through this transmission path cannot be reduced. In the conventional system, vibration-isolating control corresponding to the dispersion and deterioration of parts can be carried out by adaptive control, but the cost is increased due to the use of the load sensor for carrying out the adaptive control.

SUMMARY OF THE INVENTION

Accordingly, it is an object of the present invention to effectively reduce both the vibration and sound of the engine in a simple structure.

To achieve the above object, according to a first feature of the present invention, there is provided a vibration-isolating and sound-isolating system for a vehicle, wherein an engine is supported on a vehicle body frame through an active vibration-isolating device which is controlled so that vibration of the engine is prevented from being transmitted to the vehicle body frame, and wherein a speaker is disposed within a vehicle compartment and controlled so that noise within the vehicle compartment is actively reduced.

With the above arrangement, the vibration transmitted from the engine as the vibration source to the vehicle body frame can be efficiently reduced by actively controlling the active vibration-isolating device disposed in the vibration transmission path. In addition, intake sound and exhaust sound from a vibration source other than the engine can be effectively reduced by actively controlling the speaker disposed in the vehicle compartment.

According to a second feature of the present invention, in addition to the first feature, the active vibration-isolating device is controlled based on a vibrated state of the engine presumed from a crank pulse signal from the engine, and wherein the speaker is adaptively controlled based on a rotational speed of the engine and a noise detected by a microphone disposed within the vehicle compartment.

With the above arrangement, the active vibration-isolating device is controlled based on the vibrated state of the engine presumed from the crank pulse signal from the engine, and hence a conventionally required load sensor can be eliminated to provide a reduction in cost. In addition, it is possible to accommodate the dispersion and deterioration of the parts by the adaptive control of the speaker based on the noise detected by the microphone.

According to a third feature of the present invention, in addition to the first or second feature, the active vibration-isolating device includes an engine-mounted portion mounted on the engine, a frame-mounted portion mounted on the vehicle body frame, a first elastic member which connects the engine-mounted portion and the frame-mounted portion to each other, a liquid chamber which is defined at least partially by the first elastic member, a movable member facing the liquid chamber and reciprocally movable to change volume of the liquid chamber, an actuator adapted to generate a driving force for advancing the movable member, and a second elastic member adapted to generate a driving force for returning the movable member, the actuator being adapted to generate a driving force in an advancing direction even when the movable member is returned.

With the above arrangement, the active vibration-isolating device is arranged so that the movable member facing the liquid chamber defined at least partially by the first elastic member is advanced by the actuator, and the movable member is returned by a resilient force of the second elastic member. Even when the movable member is returned, the actuator generates the driving force in the advancing direction. Therefore, a waveform of displacement generated by the active vibration-isolating device can be made close to a vibration waveform of a sine wave generated by the vibration source, to thereby enhance the vibration-isolating performance.

In the embodiment, a front active vibration-isolating device Mf and a rear active vibration-isolating device Mr correspond to the active vibration-isolating device of the present invention; a mounting bracket 11 corresponds to the engine-mounted portion of the present invention; a mounting flange 18a corresponds to the frame-mounted portion of the present invention; and a main liquid chamber 22 corresponds to the liquid chamber of the present invention.

The above and other objects, features and advantages of the invention will become apparent from the following description of the preferred embodiment taken in conjunction with the accompanying drawings.

BRIEF DESCRIPTION OF THE DRAWINGS

FIGS. 1 to 7 show an embodiment of the present invention.

FIG. 1 is a side view of the entire arrangement of a vehicle having active vibration-isolating devices mounted therein;

FIG. 2 is a vertical sectional view of the active vibration-isolating device (a sectional view taken along a line 2—2 in FIG. 3;

FIG. 3 is a sectional view taken along a line 3—3 in FIG. 2;

FIG. 4 is a sectional view taken along a line 4—4 in FIG. 3;

FIGS. 5A to 5C are graphs each showing a waveform of displacement generated by the active vibration-isolating device;

FIG. 7 is a graph showing an effect of reducing a noise within a compartment in the present embodiment.

DESCRIPTION OF THE PREFERRED EMBODIMENT

The present invention will now be described by way of a preferred embodiment with reference to the accompanying drawings.

Figure 1:
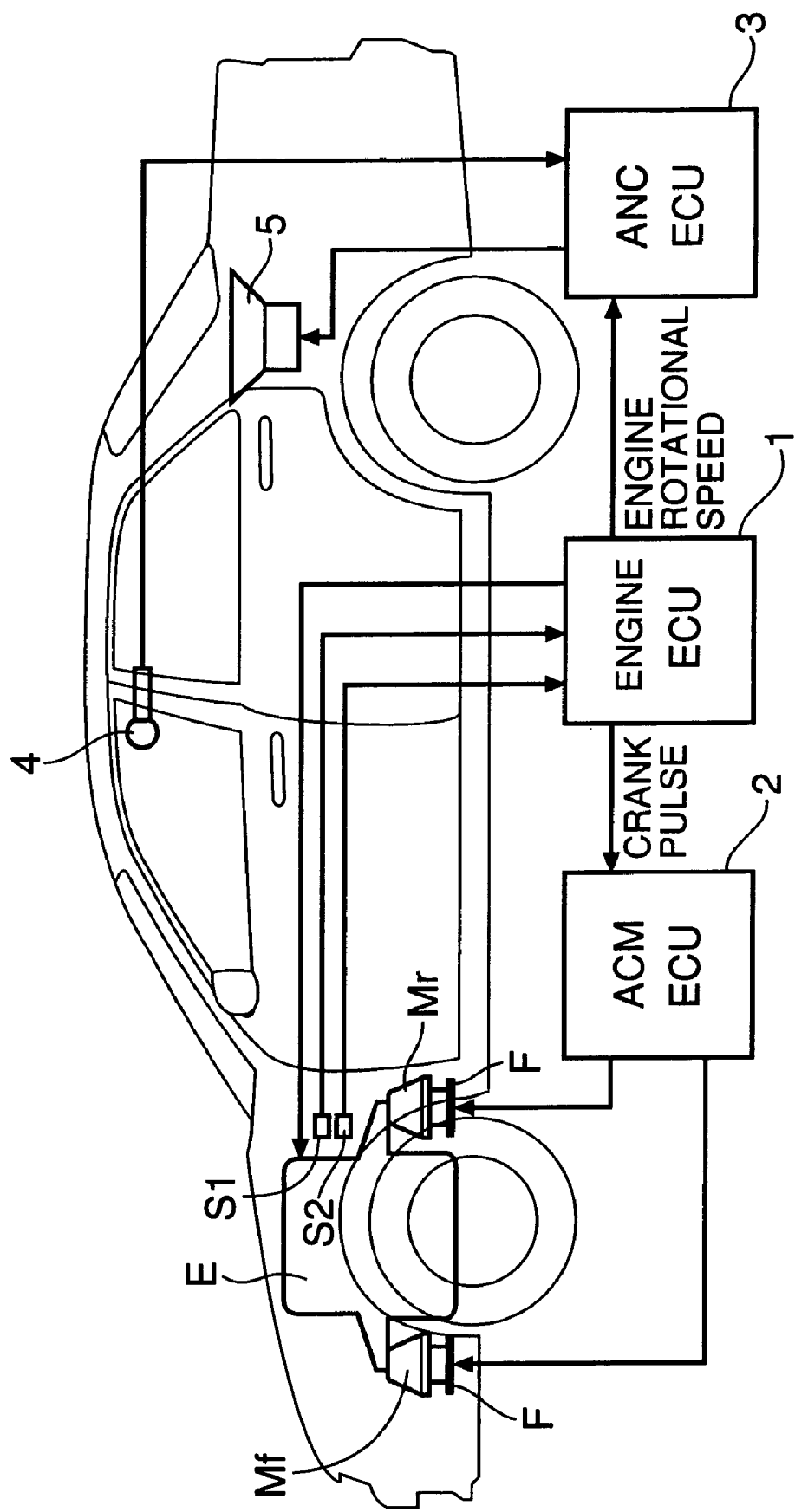

As shown in FIG. 1, an engine E which is mounted at a front portion of a vehicle body of an automobile and in which cylinders can be stopped, is supported on a vehicle body frame through a front active vibration-isolating device (ACM) Mf and a rear active vibration-isolating device (ACM) Mr which have substantially the same structure. An active vibration-isolation control unit ECU2 is connected to an engine control unit ECU1 for controlling the engine E, and controls the operations of the front active vibration-isolating device (ACM) Mf and the rear active vibration-isolating device (ACM) Mr, based on a crank pulse signal from the engine control unit ECU1. An active sound-reduction control unit ECU3 is connected to the engine control unit ECU1 for controlling the engine E, and controls the operation of a speaker 5 constituting an active sound-reducing device (ANC), based on a rotational speed signal (a reference pulse signal) from the engine control unit ECU1 and a noise signal from a microphone 4 mounted within a vehicle compartment. A crank pulse sensor S1 connected to the engine control unit ECU1 detects the crank pulse of the engine E. An engine rotational speed sensor S2 connected to the engine control unit ECU1 detects the engine rotational speed of the engine E.

Figure 2:
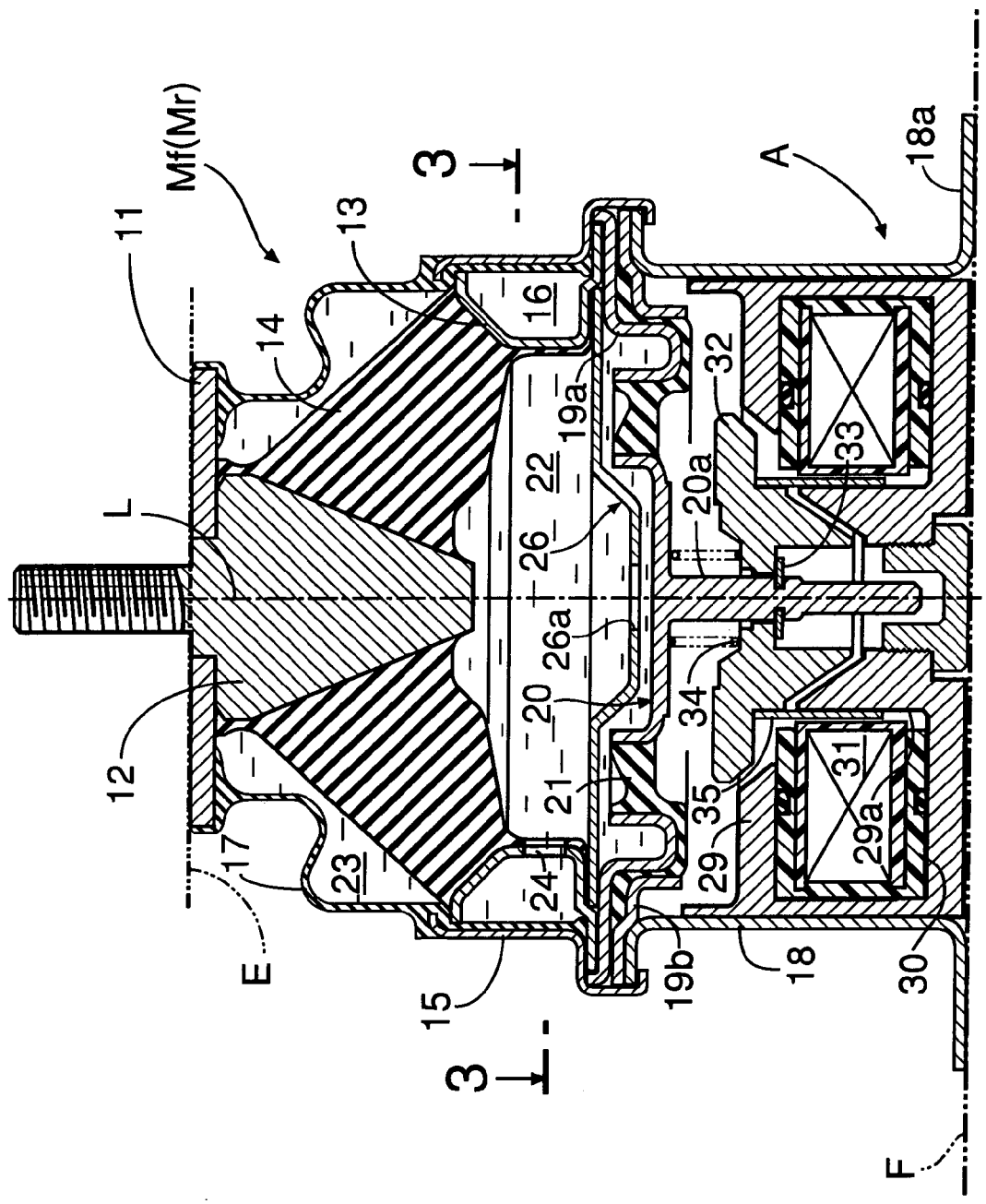
Figure 3:
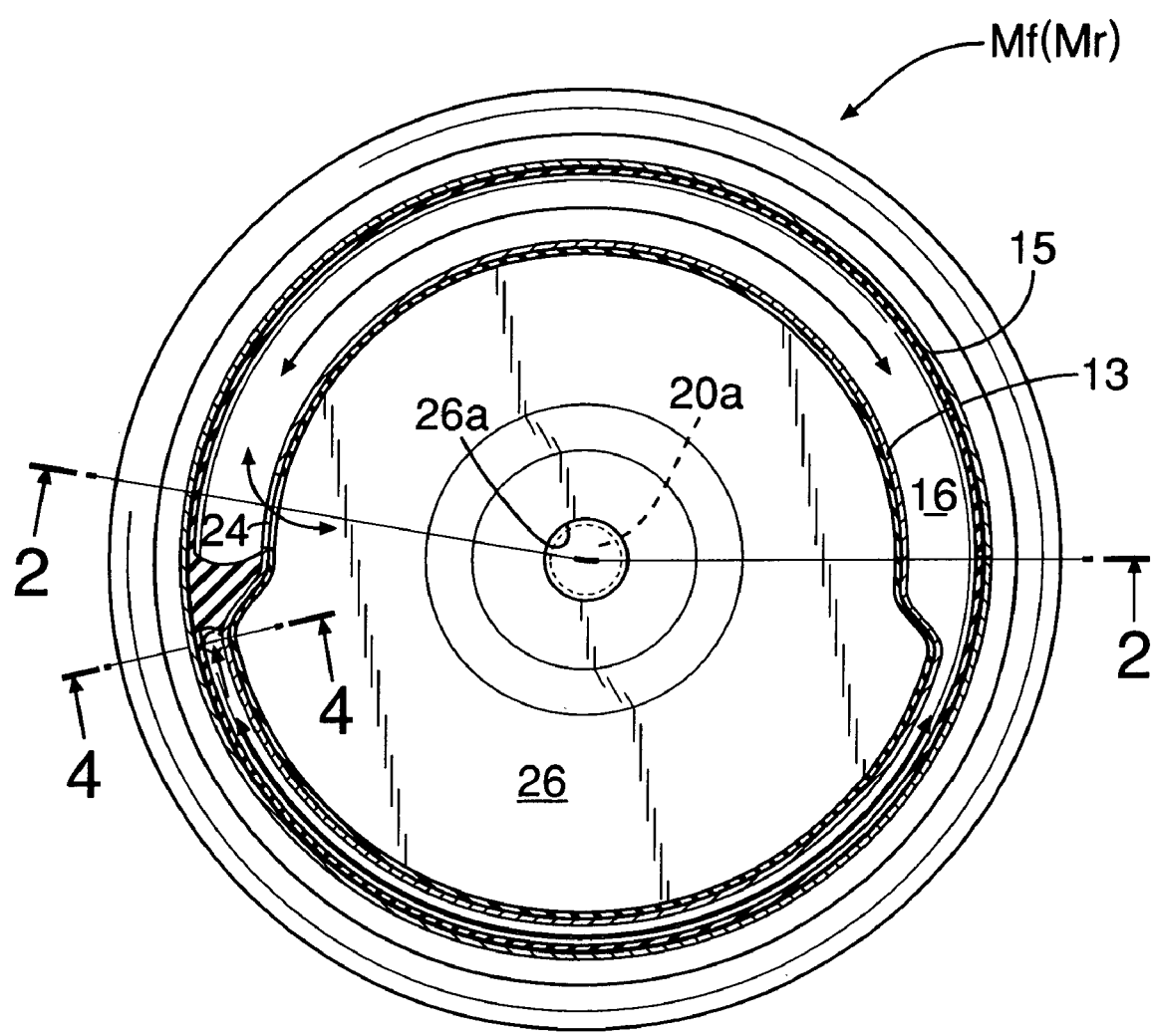
Figure 4:
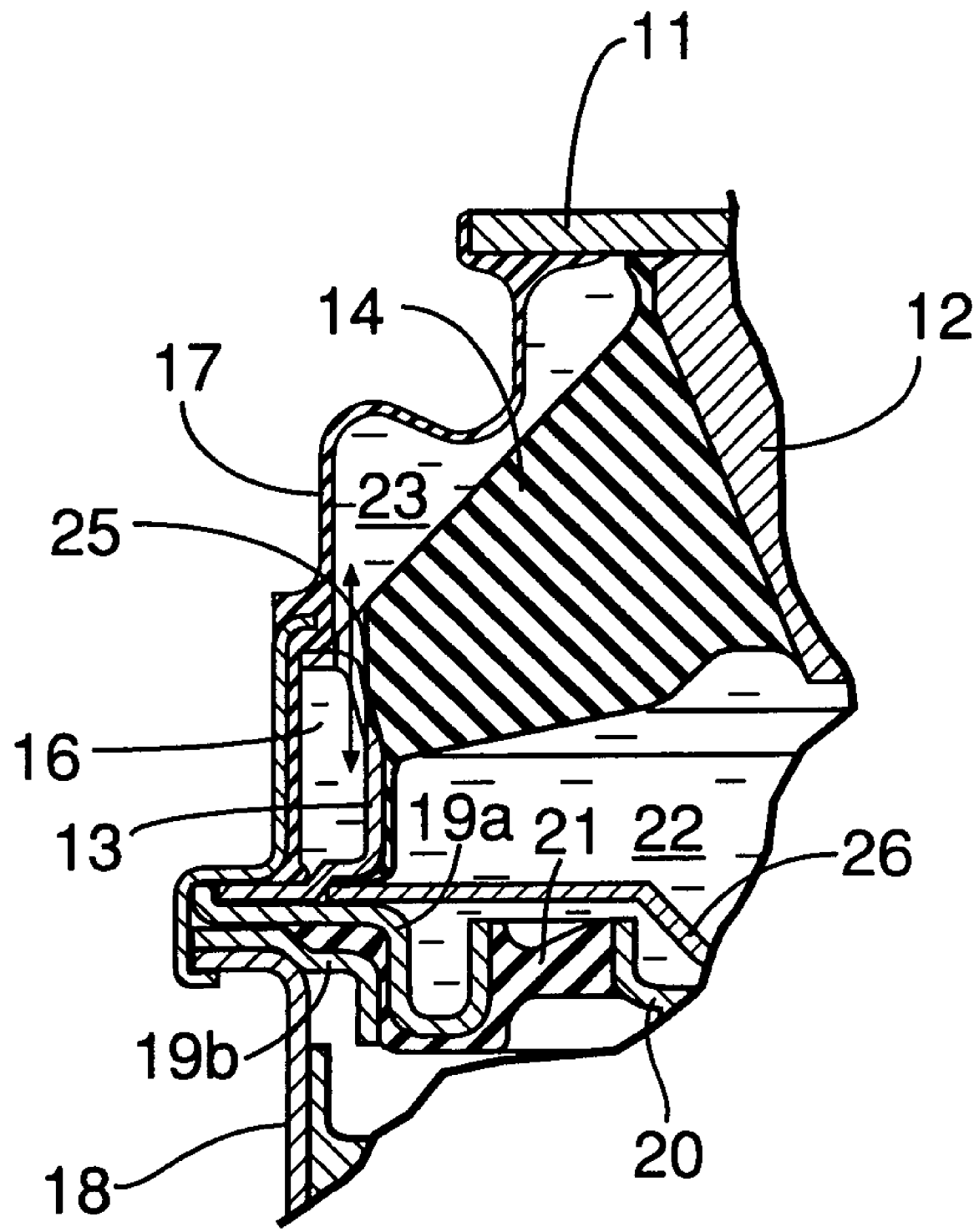

The structure of the front and rear active vibration-isolating devices Mf and Mr will be described below with reference to FIGS. 2 to 4. Since the front and rear active vibration-isolating devices Mf and Mr have substantially the same structure, the structure of the front active vibration-isolating device Mf on behalf of them will be representatively described below.

The active vibration-isolating device Mf has the structure axially symmetric with respect to an axis L, and includes a conical mounting block 12 welded to a plate-shaped mounting bracket 11 coupled to the engine E, and an orifice-defining member 13 disposed coaxially around an outer periphery of the mounting block 12. An upper end and a lower end of a first elastic member 14 formed of a thick rubber are bonded to the mounting block 12 and the orifice-defining member 13 respectively by vulcanization-bonding. An upper casing 15 is coupled to an outer periphery of the orifice-defining member 13, whereby an annular orifice is defined between them. Upper ends of the orifice-defining member 13 and the upper casing 15 and an outer end of the mounting bracket 11 are connected to each other by a diaphragm 17. Second upper and lower elastic molders 19a and 19b are fixed in a superposed manner between a lower end of the upper mounting casing 15 and an upper end of a lower casing 18. An annular second elastic member 21 is bonded to the second upper and lower elastic molders 19a and 19b and an outer periphery of a plate-shaped movable member 20 by vulcanization-bonding.

A main liquid chamber 22 is defined among the first elastic member 14, the second elastic member 21 and the movable member 20. A subsidiary liquid chamber 23 is defined between the first elastic member 14 and the diaphragm 17. A partition plate 26 is interposed between the upper second elastic holder 19a and the orifice-defining member 13. The main liquid chamber 22 is divided into two upper and lower chamber portions by a filter orifice 26a formed in a central portion of the partition plate 26. The orifice 16 provides a communication between the main liquid chamber 22 and the subsidiary liquid chamber 23. More specifically, the orifice 16 extending over substantially 360° communicates at one end with the main liquid chamber 22 through a first through-bore 24 formed in the orifice-defining member 13 and at the other end to the subsidiary liquid chamber 23 through a second through-bore 25 (see FIG. 4) formed in the orifice-defining member 13 and the first elastic member 14. The orifice 16 is formed so that a cross-sectional passage area along a substantially half circle closer to the first through-bore 24 is large and a cross-sectional passage area along a substantially half circle closer to the second through-bore 25 is small.

Thus, when the first elastic member 14 is deformed downwards by the vibration from the engine to decrease the volume of the main liquid chamber 22, a liquid forced out of the main liquid chamber 22 flows through the first through-bore 24, the orifice 16 and the second through-bore 25 into the subsidiary liquid chamber 23, whereby the diaphragm 17 facing the subsidiary liquid chamber 23 is deformed outwards. On the other hand, when the first elastic member 14 is deformed upwards by the vibration from the engine to increase the volume of the main liquid chamber 22, the liquid drawn out of the subsidiary liquid chamber 23 flows through the second through-bore 25, the orifice 16 and the first through-bore 24 into the main liquid chamber 22, whereby the diaphragm 17 facing the subsidiary liquid chamber 23 is deformed inwards.

A yoke 29 is accommodated in the lower casing 18. The yoke 29 supports therein a coil 31 which is wound around a bobbin 30 to surround the axis L. A triangular pyramidal armature 32 is slidably fitted over a shaft portion 20a protruding from a lower surface of the movable member 20 to extend along the axis L, and is biased downwards by a spring 34 mounted between the armature 32 and the lower surface of the movable member 20 to abut against a stopper 33 mounted in the middle of the shaft portion 20a. A cylindrical guide member 35 fixed to the lower surface of the armature 32 is slidably fitted over an outer periphery of a guide portion 29a of the yoke 29. The armature 32 is guided by the guide member 35 and the guide portion 29a so that it is moved along the axis L.

The yoke 29, the bobbin 30, the coil 31 and the armature 32 constitute an actuator A for the active vibration-isolating device Mf. When the coil 31 of the actuator A is in a deexcited state, the armature 32 is spaced upwards apart from the yoke 29 by a resilient force of the second elastic member 21. When the coil 31 is excited in this state, the armature 32 is attracted to the yoke 29, and the movable member 20 having the shaft portion 20a pulled is moved downwards against the resilient force of the elastic member 21.

The operation of the embodiment of the present invention having the above-described arrangement will be described below.

First, the operations of the front and rear active vibration-isolating devices Mf and Mr will be described. In a range of idling rotational speed of the engine E, the actuator A is maintained in a non-operated state. When the volume of the main liquid chamber 22 is increased or decreased by the vibration of the engine E, the volume of the subsidiary liquid chamber 23 is correspondingly increased or decreased. In this state, the vibration transmitted from the engine E to the vehicle body frame F can be effectively reduced, because the characteristic of the orifice 16 and the spring constant of the first elastic member 14 are set such that a lower spring constant and a high damping force are exhibited in the range of idling rotational speed.

In a range of rotational speed higher than the idling rotational speed of the engine E, the inside of the orifice 16 connecting the main liquid chamber 22 and the subsidiary liquid chamber 23 to each other is in a choked state, and hence the actuator A is operated to exhibit a vibration-isolating function. Namely, when the engine E is displaced downwards due to the vibration to decrease the volume of the main liquid chamber 22 thereby increasing the liquid pressure, the coil 31 is excited to attract the armature 32. As a result, the armature 32 is moved downwards along with the movable member 20 to deform the second elastic member 21 connected at its inner periphery to the movable member 20 downwards. Thus, the volume of the main liquid chamber 22 is increased to suppress the increase in liquid pressure, and hence the front and rear active vibration-isolating devices Mf and Mr generate an active support force for preventing the downward transmission of a load from the engine E to the vehicle body frame F.

On the other hand, when the engine E is displaced upwards to increase the volume of the main liquid chamber 22 to decrease the pressure, the coil 31 is deexcited to cancel the attraction of the armature 32. As a result, the armature 32 is moved upwards along with the movable member 20 by the resilient force of the second elastic member 21. Thus, the volume of the main liquid chamber 22 is decreased to suppress the decrease in liquid pressure, and hence the front and rear active vibration-isolating devices Mf and Mr generate an active support force for preventing the upward transmission of a load from the engine E to the vehicle body frame F.

A solid line in each of FIGS. 5A to 5C shows a waveform of displacement generated by the front and rear active vibration-isolating devices Mf and Mr. FIG. 5A shows the waveform when the filter orifice 26a (see FIG. 2) is not provided, wherein the displacement of a high frequency, which is different from the vibration frequency of the engine E, is generated to worsen the vibration and the noise. On the other hand, FIG. 5B shows the waveform when the filter orifice 26a is provided. In this case, the generation of the displacement of the high frequency is prevented by the flowing of the liquid from and back to the main liquid chamber 22 through the filter orifice 26a with the vibration of the movable member 20, so that it is possible to reduce the vibration and the noise during traveling of the vehicle at a constant speed particularly in a range of 25 km/hr to 50 km/hr.

However, the waveform of the vibration generated by the engine E is a sine waveform, whereas the waveforms of the forces generated by the front and rear active vibration-isolating devices Mf and Mr shown in FIG. 5B are displaced from the sine waveform, leaving a possibility of further reducing the vibration and the noise.

The front and rear active vibration-isolating devices Mf and Mr move the movable member 20 reciprocally downwards against the resilient force of the second elastic member 21 by exciting the coil 31 to attract the armature 32, and move the movable member 20 reciprocally upwards by the resilient force of the second elastic member 21 by deexciting the coil 31 to release the armature 32. FIG. 6B shows a waveform of electric current supplied to the coil 31 of an actuator A for conventional front and rear active vibration-isolating devices Mf and Mr, wherein the electric current is decreased to almost zero simultaneously with the completion of an attracting stoke in which the armature 32 is advanced. A duty ratio of a voltage applied to the coil 31 is zero at the completion of the attracting stroke, but electric current slightly flows due to a response delay at an initial stage of a releasing stroke in which the armature 32 is returned. However, an attracting force substantially sufficient for attracting the armature 32 is not generated.

Figure 6A:
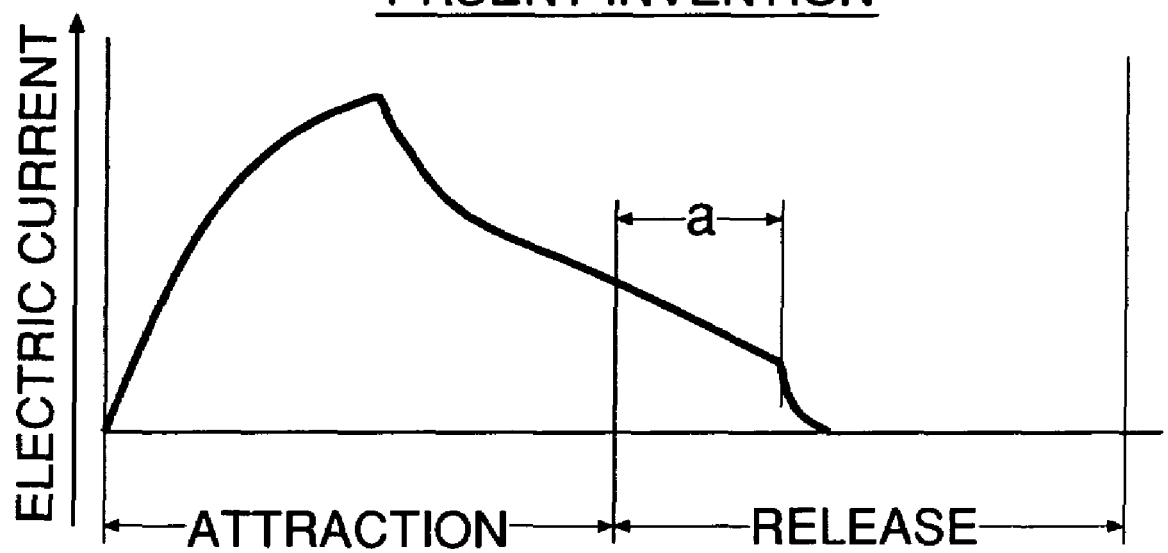
FIGS. 6A and 6B are graphs each showing a waveform of electric current supplied to a coil of an actuator.
Figure 6B:
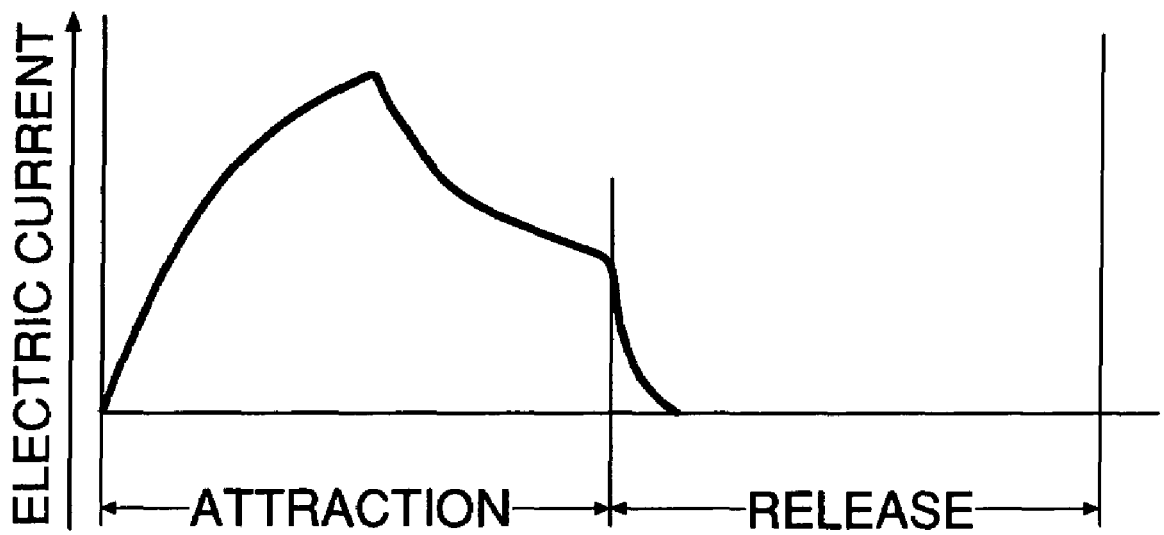

In contrast, FIG. 6A shows a waveform of electric current supplied to the coil 31 of the actuator A for the front and rear active vibration-isolating devices Mf and Mr in the present embodiment. In this case, even if the attracting stroke of the armature 32 has been finished and shifted to the releasing stroke, electric current is supplied successively to the coil 31 in a region a of the releasing stroke. Namely, the waveform of the displacement generated by the front and rear active vibration-isolating devices Mf and Mr can be made close to a sine wave, as shown in FIG. 5C, by attracting the armature 32 by the coil 31 against the resilient force of the second elastic member 21 when the movable member 20 is returned upwards by the resilient force of the second elastic member 21. Thus, it is possible to effectively eliminate the vibration of a sine wave generated by the engine E, to enhance the vibration-isolating effect and the sound-isolating effect.

In general, the front and rear active vibration-isolating devices Mf and Mr are controlled by a load transmitted from the engine E to the vehicle body frame F. In the present embodiment, however, the load is presumed from a fluctuation in angular acceleration of a crankshaft calculated from a time interval of a crank pulse, and the front and rear active vibration-isolating devices Mf and Mr are controlled based on the presumed load. Therefore, a conventionally used expensive load sensor can be eliminated to contribute to a reduction in cost. The reason why the load can be presumed from the angular acceleration of the crankshaft is described below. The angular speed of the crankshaft of the engine E constantly fluctuates such that the angular speed becomes low in the compression stroke and high in the explosion stroke. The fluctuation in the angular speed of the crankshaft causes a vibration of the engine E. Therefore, the angular acceleration which is obtained by differentiation of the angular speed with time is equivalent to the engine vibration, i.e., the load which is transmitted from the engine E to the vehicle body frame F.

Frequencies of exhaust sound and intake sound filled in the vehicle compartment are correlative to an engine rotational speed, and hence the exhaust sound and the intake sound can be reduced by operating the speaker 5 using the engine rotational speed as a parameter to generate a sonic wave which has a phase eliminating a sonic wave within the vehicle compartment. At this time, a noise within the vehicle compartment can be effectively reduced by carrying out adaptive control based on the noise detected within the vehicle compartment by the microphone 4.

Figure 7:
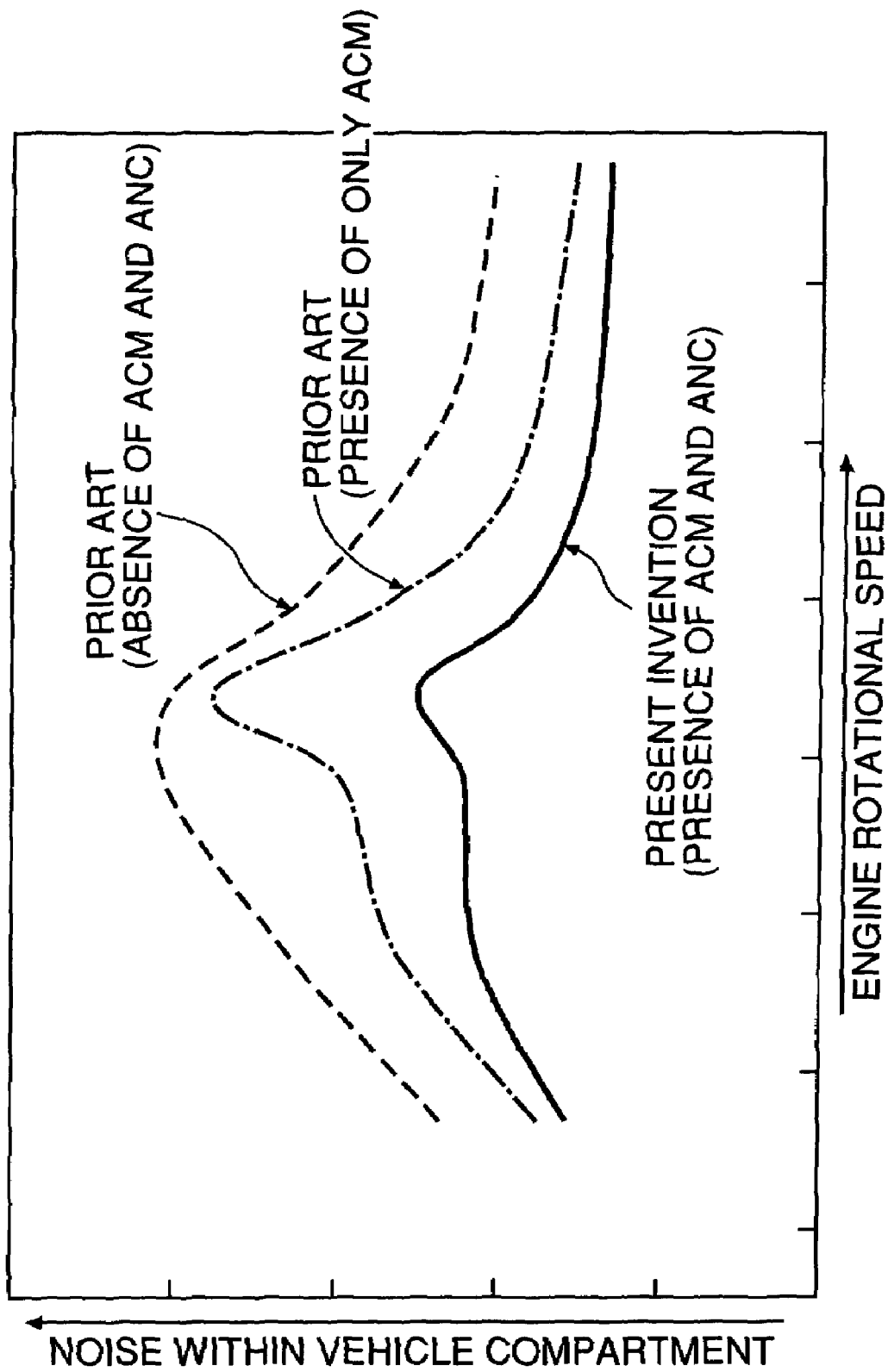

As shown in FIG. 7, the noise (see a dashed line in FIG. 7) is reduced when the control of the front and rear active vibration-isolating devices Mf and Mr is carried out, as compared with the noise (see a broken line in FIG. 7) when neither the control of the front and rear active vibration-isolating devices Mf and Mr nor the control of the speaker 5 is carried out. Further, the noise (see a solid line in FIG. 7) is further reduced when the control of the speaker 5 is carried out. Especially, the noise of a particular frequency incapable of being reduced only by the control of the front and rear active vibration-isolating devices Mf and Mr, is remarkably reduced by the control of the speaker 5.

As described above, the vibration transmitted from the engine E to the vehicle body frame F is reduced by controlling the front and rear active vibration-isolating devices Mf and Mr, and the noise within the vehicle compartment is reduced by controlling the speaker 5, and hence the vibration and noise characteristics of the vehicle can be improved by such a synergic effect. Especially, because the microphone 4 for adaptive control of the speaker 5 is inexpensive and the speaker 5 for an audio set can be used without any modification, the present invention can be achieved with a low cost.

Although the embodiments of the present invention have been described in detail, it will be understood that various modifications in design may be made without departing from the spirit and scope of the invention defined in the claims.

For example, the two front and rear active vibration-isolating devices Mf and Mr are mounted in the embodiment, but three or more vibration-isolating devices may be mounted. In addition, the number of the speaker 5 is not limited to one.

What is claimed is:

1. A vibration-isolating and sound-isolating system for a vehicle, having an engine and a vehicle body frame, said vehicle having a vehicle compartment, said system comprising:
   a vibration-isolating device supporting said engine on said vehicle body frame;
   a first controller controlling said vibration-isolating device so that vibration of the engine is inhibited from being transmitted to the vehicle body frame;
   a speaker disposed within said vehicle compartment;
   a second controller controlling noise within said vehicle compartment by controlling sound from said speaker so that the noise is reduced;
   a first sensor detecting a crank pulse signal from the engine;
   a second sensor detecting rotational speed of the engine; and
   a microphone disposed within said vehicle compartment,
   wherein said vibration-isolating device is controlled by said first controller based on the crank pulse signal from the engine as detected by the first sensor and sound from said speaker is controlled based on the rotational speed of the engine as detected by the second sensor and on the noise sensed by said microphone.

2. A vibration-isolating and sound-isolating system for a vehicle, having an engine and a vehicle body frame, said vehicle having a vehicle compartment, said system comprising:
   a vibration-isolating device supporting said engine on said vehicle body frame;
   a first controller controlling said vibration-isolating device so that vibration of the engine is inhibited from being transmitted to the vehicle body frame;
   a speaker disposed within said vehicle compartment; and
   a second controller controlling noise within said vehicle compartment by controlling sound from said speaker so that the noise is reduced;
   wherein said vibration-isolating device includes an engine-mounted portion mounted on the engine, a frame-mounted portion mourned on the vehicle body frame, a first elastic member which connects the engine-mounted portion and the frame-mounted portion to each other, a liquid chamber which is defined at least partially by the first elastic member, a movable member facing the liquid chamber and reciprocally movable to change volume of the liquid chamber, an actuator adapted to generate a driving force for advancing the movable member, and a second elastic member adapted to generate a driving force for returning the movable member, the actuator being adapted to generate a driving force in an advancing direction even when the movable member is returned.

3. A vibration-isolating and sound-isolating system for a vehicle having an engine and a vehicle body frame, said vehicle having a vehicle compartment, said system comprising:
   means for isolating vibration of said engine from said vehicle body frame;
   first means for controlling said vibration isolating means so tat vibration of the engine is inhibited from being transmitted to the vehicle body frame;
   a speaker disposed within said vehicle compartment;
   second means for controlling noise with said vehicle compartment by controlling sound from said speaker so that the noise is reduced;
   first sensor means for detecting a crank pulse signal from the engine;
   second sensor means for detecting rotational speed of the engine; and
   a microphone disposed within said vehicle compartment,
   wherein said vibration-isolating device is controlled by said first controlling means based on the crank pulse signal from the engine as detected by said first sensor means and sound from said speaker is controlled based on the rotational speed of the engine as detected by said second sensor means and on the noise sensed by said microphone.

* * * * *